(12) United States Patent
Dallongeville et al.

(10) Patent No.: US 6,665,365 B2
(45) Date of Patent: Dec. 16, 2003

(54) STORAGE CONTAINER FOR RADIOACTIVE MATERIALS

(75) Inventors: Maurice Dallongeville, Epingy sur Orge (FR); Christophe Vallentin, Ecaquelon (FR)

(73) Assignee: Societe pour les Transports de l'Industrie Nucleaire-Transnucleaire, Montigny le Bretonneux (FR)

( * ) Notice: Subject to any disclaimer, the term of this patent is extended or adjusted under 35 U.S.C. 154(b) by 0 days.

(21) Appl. No.: 10/129,164

(22) PCT Filed: Aug. 30, 2001

(86) PCT No.: PCT/FR01/02700

§ 371 (c)(1), (2), (4) Date: May 1, 2002

(87) PCT Pub. No.: WO02/19343

PCT Pub. Date: Mar. 7, 2002

(65) Prior Publication Data

US 2002/0163989 A1 Nov. 7, 2002

(30) Foreign Application Priority Data

Sep. 1, 2000 (FR) .............................................. 00 11179

(51) Int. Cl.⁷ .............................................. G21C 19/40
(52) U.S. Cl. .................... 376/272; 376/260; 376/261; 250/506.1; 250/507.1; 250/515.1; 250/518.1
(58) Field of Search ................................ 376/260, 261, 376/272; 250/506.1, 507.1, 515.1, 518.1

(56) References Cited

U.S. PATENT DOCUMENTS

| | | | |
|---|---|---|---|
| 3,859,533 A | | 1/1975 | Suvanto ....................... 250/507 |
| 4,024,406 A | * | 5/1977 | Bevilacqua .................. 376/272 |
| 4,156,147 A | * | 5/1979 | Naum et al. ............. 250/515.1 |
| 4,203,038 A | * | 5/1980 | Takahashi et al. .......... 376/272 |
| 4,497,770 A | * | 2/1985 | Krieger ....................... 376/272 |

(List continued on next page.)

FOREIGN PATENT DOCUMENTS

| | | | |
|---|---|---|---|
| DE | 2938618 | * | 4/1981 |
| EP | 0 520 438 A | | 12/1992 |
| EP | 0 752 151 B1 | | 10/1998 |
| FR | WO/95/26030 | * | 9/1995 |
| GB | 2233595 | * | 1/1991 |
| GB | 2 289 007 A | | 11/1995 |
| JP | 8-136695 | * | 8/1996 |
| JP | 9-105798 | * | 4/1997 |
| WO | WO/94/20964 | * | 9/1994 |
| WO | WO 94/20964 | * | 9/1994 |

OTHER PUBLICATIONS

Simalex, Material specification for aluminum alloy <http://www.simalex.com>.*
ASSDA Thermal properties of austenitics–stainless steel, <http://www.assda.asn.au/austenit.html>.*
Kiyoshi, N., *Housing Basket for Transport and Storage Vessel of Spent Nuclear Fuel*, EPO Publication No. 09105798, Apr. 22, 1997, p. 1 abstract only.

*Primary Examiner*—Charles T. Jordan
*Assistant Examiner*—John Richardson
(74) *Attorney, Agent, or Firm*—Christensen O'Connor Johnson Kindness PLLC

(57) ABSTRACT

The basket comprises a bundle of tubes (10) connected to each other by an assembly structure (14) so as to form a regular network of compartments (16). Cross pieces (12) are placed between the tubes (10) so as to define a second wall approximately continuous around each compartment (16) surrounding the first wall materialized by tubes (10) and at least partially in contact with this wall. Thus, baskets with compartments with arbitrarily shaped cross sections, and particularly square, rectangular, hexagonal or circular cross sections, can be made for a limited cost.

21 Claims, 5 Drawing Sheets

U.S. PATENT DOCUMENTS

| | | | |
|---|---|---|---|
| 4,746,487 A | * 5/1988 | Wachter | 376/272 |
| 4,770,844 A | * 9/1988 | Davis, Jr. | 376/272 |
| 4,788,030 A | * 11/1988 | Bosshard | 376/272 |
| 4,800,283 A | * 1/1989 | Efferding | 250/507.1 |
| 4,827,139 A | 5/1989 | Wells et al. | 250/507.1 |
| 4,930,650 A | 6/1990 | Wells | 220/21 |
| 5,032,348 A | * 7/1991 | Blum et al. | 376/272 |
| 5,353,317 A | * 10/1994 | Barkhurst | 376/261 |
| 5,373,540 A | * 12/1994 | DeCooman et al. | 376/272 |
| 5,438,597 A | * 8/1995 | Lehnert et al. | 376/272 |
| 5,443,732 A | * 8/1995 | Lahoda et al. | 210/635 |
| 5,629,964 A | * 5/1997 | Roberts | 376/327 |
| 5,715,289 A | 2/1998 | Kirchner et al. | 376/272 |
| 5,742,655 A | * 4/1998 | Hertz et al. | 376/333 |
| 5,914,994 A | * 6/1999 | Wasinger et al. | 376/272 |
| 6,064,710 A | * 5/2000 | Singh | 376/272 |
| 6,118,838 A | * 9/2000 | Robert et al. | 376/272 |

* cited by examiner

STORAGE CONTAINER FOR RADIOACTIVE MATERIALS

CROSS-REFERENCE TO RELATED APPLICATIONS

This application is a U.S. national phase application under 35 U.S.C. §371 of International Application No. PCT/FR01/02700, filed Aug. 30, 2001, which claims priority from French Patent Application No. 00 11179, filed Sep. 1, 2000.

TECHNICAL DOMAIN

The invention relates to a storage basket containing several adjacent compartments, each of which is designed to contain conditioned radioactive materials such as fuel elements from nuclear reactors or others.

The storage basket according to the invention may be used in particular for the transport or storage of fuel elements from nuclear reactors or other nuclear materials in a wet or dry environment. In particular, in order to achieve this the basket according to the invention may particularly be placed in a transport or storage container, or in a nuclear reactor pool or inside a building. It may also be buried in geological layers.

Furthermore, the invention is particularly suitable for the manufacture of compact baskets with a regular prismatic polygonal section, for example hexagonal. In particular, this type of basket may contain fuel elements with a hexagonal cross section such as VVER type elements used in some nuclear reactors, in an optimised volume. Obviously, the basket according to the invention may also be formed of compartments with a simpler cross section, for example square or rectangular, that in particular may contain fuel elements such as elements frequently used in light water nuclear reactors.

STATE OF THE ART

Fuel elements for nuclear reactors and other radioactive materials to be transported or stored are generally arranged firstly in receptacles or compartments of a basket (also called rack or storage rack), that will itself be placed in the inner cavity of a transport container or storage container or in an appropriate storage installation.

This type of basket must fulfil several functions. These functions include particularly mechanical strength and packing of radioactive materials, and ease of handling.

Furthermore, depending on the nature of the radioactive materials, the basket must perform different functions related to nuclear safety during transport or storage. These functions include mainly the need to dissipate heat produced by the materials contained in the basket and control of nuclear criticality, when these materials are fissile materials that could provoke a chain reaction.

The purpose of the mechanical strength function is to maintain the geometry of the basket during handling operations under the effect of accelerations encountered during transport and also in the case of an accidental collision or if the basket is dropped, to maintain control of the nuclear criticality under these circumstances.

Existing baskets normally comprise straight line compartments usually delimited by composite sandwich type partitions formed from successive layers of different materials in contact with each other such that each of them fulfils at least one of the above mentioned functions.

Thus for example, a layer of a good heat conducting material such as aluminium, copper and aluminium and copper alloys may be used, together with a layer of a structural material to provide the mechanical strength of the basket in the case of an accidental shock, and a layer of a material containing a neutron absorbing element such as boron or cadmium. In particular, the structural material may be a stainless steel, or a carbon steel, or an aluminium or one of its alloys. The material containing the neutron poison element is usually a stainless steel, an aluminium or its alloys or a sintered material, for example based on boron carbide $B_4C$. In the case of stainless steel or aluminium, the neutron poison element is usually added directly into this material, and does not significantly reduce its mechanical strength. A single layer of material is then sufficient to provide mechanical strength and control over criticality.

In a first type of existing basket, composite partitions of the compartments are obtained by putting flat or profiled elements called "strips" adjacent to each other and making them intersecting in the longitudinal direction. Each strip is then composed of a multi layer placement of materials like those mentioned. Another known method of achieving a regular stack that is robust in the longitudinal direction is to form notches in the strips that cooperate with each other in order, such that the strips intersect perpendicular to the centre line of the compartments and are rigidly fixed to each other.

In another type of existing basket, the composite strips are replaced by successive layers of different materials alternated in the longitudinal direction of the compartments. More precisely, strips with the same geometry are manufactured from different materials and placed alternately, in order to create a sequence of components in the longitudinal direction each fulfilling at least one of the above mentioned functions. U.S. Pat. No. 5,032,348 describes a basket made in this manner.

In some cases and under some conditions, it is possible to make a basket from a single material. For example, aluminium is a good heat conductor, and it is easy to add a neutron absorbing element such as boron into it. In order to give the aluminium elements sufficient mechanical strength, these elements are then made in the form of sufficiently thick plates, or beams with a rigid straight H or U type cross section.

However, the reduction in the number of materials used which simplifies the manufacture and reduces costs, can lead to a certain loss of performance. Thus, in the above mentioned example of a basket composed entirely of a stack of aluminium components, it is difficult to maintain the mechanical strength, particularly at the high temperatures that are possible in a basket containing radioactive materials. Consequently, the thickness of the aluminium components has to be increased, or particularly thick shapes are necessary as mentioned above. The result is that the basket becomes excessively heavy or large which is a disadvantage, unless the number of compartments and therefore the capacity of the basket are reduced.

Conversely, when a high performance basket has to be made, for example due to the nature of the radioactive materials or due to stringent mass or dimensional constraints, baskets with a composite structure, in other words formed of several materials adapted to each of the functions, are usually better adapted despite their complexity and their higher cost.

Regardless of the number of materials used, a number of difficulties can arise with manufacturing of existing baskets. The strips must be manufactured with a very high precision, so that they can be perfectly aligned when they are stacked.

This condition is essential to obtain compartments with a constant cross section and with perfectly smooth walls, in order to prevent any risk of radioactive materials getting trapped when they are added and extracted. Furthermore, when notches are formed in the strips, the notches must be machined very precisely with a small assembly play, to ensure that the basket has the required stiffness without reducing the alignment of the strips.

When the compartments have a square or rectangular cross section, these difficulties can be overcome by precision machining, although the cost is not negligible. As shown in FIG. 6 in U.S. Pat. No. 5,032,348, when the basket contains this type of compartment, single piece strips are usually used which pass from one side of the straight section of the basket to the other without any discontinuity in the material between partitions in adjacent compartments. This configuration improves the cohesion and the mechanical strength of the basket.

The use of these techniques is much more difficult for baskets with polygonal compartments (for example hexagonal compartments) with a larger number of sides. Considering the example of hexagonal compartments, strips folded in the form of broken lines then have to be used, that are then put into order along appropriate directions as illustrated in FIG. 5 in document EP-A-0 329 581 mentioned above. In this case, it is impossible to use single piece strips passing through the straight section of the basket and therefore a large number of elements of strips have to be placed in this straight section. The discontinuity of strip elements resulting from this layout has the effect of reducing the transverse stiffness and therefore the overall mechanical strength of the basket. Another result of the increased number of strip elements and their folded shapes is that the manufacturing difficulties and assembly difficulties mentioned above are considerably increased. Considering the fact that all these strip elements have to be duplicated and stacked over the entire height of the basket, the only way to obtain compartments with a constant cross section and smooth walls is to use special manufacturing techniques to minimize dimensional tolerances and assembly clearances. This leads to very high manufacturing costs.

As illustrated in document EP-A-0 752 151, another known method is to make a basket formed of compartments with prismatic regular polygonal cross section by assembling a bundle of identical straight metallic tubes each with this cross section. The tubes may be made in a single piece, with the required shape and dimensions and with reasonable manufacturing costs, by using usual extrusion techniques. The length of the tubes is advantageously chosen to be equal to the height of the basket, which contributes to facilitating assembly and reducing costs. The compactness and cohesion of the tube bundle are then maintained by assembly means such as encircling structures surrounding the bundle and distributed over the entire height of the bundle.

The main disadvantage of the layout described in document EP-A-0 752 151 is that it is restricted to tubes made of a single material. In this case this material must be capable of performing all the functions mentioned above. As already mentioned, the use of a single material has advantages in terms of manufacturing and cost reductions, but can cause a reduction in the performances of the basket and particularly its storage capacity, in order to respect weight and dimensional constraints.

In conclusion, none of the current techniques for manufacturing storage baskets for radioactive materials is capable of fulfilling all the required functions simply and optimally without reducing the performances of the basket, particularly in terms of its storage capacity, regardless of the shape of the compartments, even in the case of arbitrary polygons such as hexagonal shapes.

DESCRIPTION OF THE INVENTION

The purpose of the invention is a storage basket in which radioactive materials such as fuel elements from nuclear reactors can be inserted, and that performs all required functions for this basket in an optimised manner such as the criticality control, heat transfer and mechanical strength, regardless of the shapes of the compartments, while maintaining or improving the storage capacity of existing baskets.

According to the invention, this result is obtained by means of a storage basket for radioactive materials comprising several straight metallic tubes laid out in a bundle and assembly means grouping the tubes parallel to each other along a regular network in order to form several adjacent compartments capable of containing the said radioactive materials, each of the tubes materializing a first approximately continuous wall of a corresponding compartment, the said basket being characterized in that it also comprises several metallic cross pieces each including at least three flanges connected to each other at a common edge, the cross pieces being placed between the tubes so as to define a second approximately continuous wall around the first wall of each compartment and at least in partial contact with it.

Due to the fact that each of the compartments is delimited by a first wall materialized by the tube that surrounds it and by a second wall materialized by the flanges of cross pieces inserted between the tubes, there is no longer any particular difficulty in manufacturing baskets made up of compartments with an arbitrary prismatic cross section. Furthermore, the composite nature of the walls of the compartments makes it easy to perform all the functions mentioned above. In other words, baskets according to the invention make it easy to make the best use of the properties of the different materials to optimise performances and the storage capacity of the baskets, while enabling a good diversity of shapes, unlike the situation with baskets according to prior art.

In the preferred embodiments of the invention, the cross pieces are in contact with each other through the outside edges of their flanges opposite the said common edges. This is a means of guaranteeing thermal contact between the flanges of the cross pieces and continuity of the second wall.

Depending on the case, the outside edges of the flanges of the cross pieces can then be provided with flats approximately parallel to the planes of the said flanges, through which the cross pieces are in contact with each other, or complementary tenon-mortise type shapes through which the cross pieces fit into each other.

According to a first embodiment of the invention, the cross section of the tubes is prismatic and square or rectangular, and the cross pieces comprise four flanges oriented along two directions orthogonal to each other.

According to a second embodiment of the invention, the tubes have a prismatic hexagonal section and the cross pieces comprise three flanges oriented along three directions forming angles of 120°.

According to a third embodiment of the invention, the tubes have a prismatic circular section and the cross pieces comprise four flanges oriented along two directions orthogonal to each other.

In all cases, each cross piece may be either in the form of a single piece with a length approximately equal to the length of the tubes, or it may be formed of several segments of cross pieces placed end to end and their total length is then approximately equal to the length of the tubes.

In order to contribute to the efficiency of heat transfer, the cross pieces preferably comprise at least one layer of a material chosen from the group comprising aluminium, copper and their alloys.

When the radioactive materials are fissile materials, at least one material forming the tubes and/or the cross pieces incorporates a neutron absorbing material. This neutron absorbing material may particularly be boron, hafnium or cadmium. In particular, it is advantageously boron enriched in boron 10, to at least 80% by weight.

In one embodiment, the flanges of the cross pieces comprise at least two distinct layers of materials in contact with each other.

To enable the tubes to perform one of their essential functions, namely to provide mechanical strength of the basket under all circumstances, the said tubes are advantageously made of a material chosen from the group comprising stainless steel, carbon steel, aluminium and their alloys with good mechanical properties, and titanium.

According to a first embodiment of the assembly means, they comprise at least two metallic encircling structures surrounding the tube bundles at different levels.

Advantageously, the encircling structures are then made of a material with a coefficient of thermal expansion less than or equal to the coefficient of thermal expansion of the material from which the tubes are made.

According to a second embodiment of the assembly means, they comprise at least two plates located at different levels of the basket and connecting devices rigidly fixing the said plates to each other, each plate being perforated by a network of holes with the same shape as the prismatic cross section of the tubes and into which the said tubes are fitted.

In this case, at least one of the plates is preferably located at one end of the basket.

Furthermore, the connecting devices are advantageously fixed to the plates by screws.

In the second embodiment of the assembly means, each connecting device preferably comprises an inner surface complementary to the outer surface of the tube bundle and associated cross pieces, and a regular outer surface forming an outer surface of the basket and providing it with a regular surface.

In all cases, the basket may also comprise a rigid bottom.

BRIEF DESCRIPTION OF THE DRAWINGS

We will now present different embodiments of the invention as non-limitative examples with reference to the attached drawings in which.

DETAILED DESCRIPTION OF PREFERRED EMBODIMENT OF THE INVENTION

Figure 1:
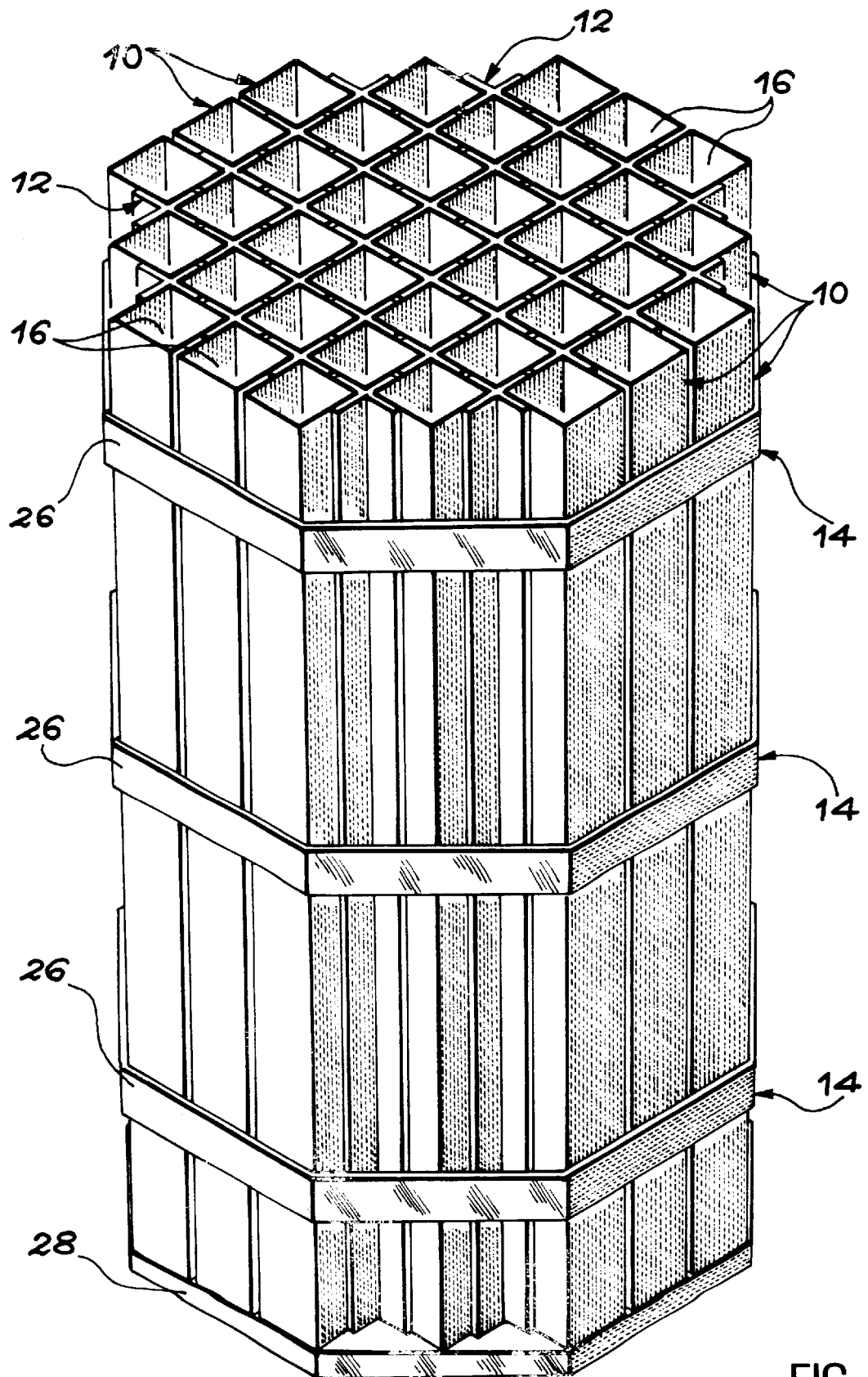
FIG. 1 is a perspective view that diagrammatically shows a storage basket for radioactive materials according to a first embodiment of the invention.

FIG. 1 illustrates a storage basket for radioactive materials according to a first preferred embodiment of the invention. This storage basket comprises several tubes 10, several cross pieces 12 (FIG. 2) placed between the tubes 10, and assembly means 14 making the assembly fit together and making it compact.

As already mentioned, the radioactive materials that could be transported in the basket may be of any nature whatsoever. In particular, they may be fuel elements from nuclear reactors with a square or hexagonal cross section.

The tubes 10 are straight metallic tubes and are all identical. In particular, all tubes 10 have the same section and the same length and they are made of the same material. The assembly means 14 contain tubes 10 in a bundle, parallel to each other, along a regular network.

More precisely, the bundle of tubes 10 is designed to be placed vertically. The result is several adjacent compartments 16, each of which can contain conditioned radioactive materials, for example such as fuel elements from nuclear reactors, for transport and/or storage purposes.

Each of the tubes 10 materialises a first wall of the corresponding compartment. This first wall surrounds the compartment, almost without any discontinuity, over its entire height and around its entire periphery.

The cross pieces 12 are metallic parts formed of a number of plane plates 18 called "flanges", usually without any openings. All flanges 18 for a single cross piece 12 are connected to each other by a straight common edge and are distributed at equal angular intervals around the said edge.

In the embodiment illustrated in FIG. 1, the length of the cross pieces 12 is approximately equal to the length of the tubes 10.

In one variant embodiment (not shown) each cross piece 12 is formed from several segments of cross pieces placed end to end. The total length of these segments is then approximately equal to the length of the tubes 10.

Each of the cross pieces 12 is associated with a group of adjacent tubes 10, the number and layout of which depends on the prismatic cross section of tubes and the shape of the network formed by the tube bundle. The common edge of the cross piece is placed at the centre of the group of tubes 10 and is laid out parallel to the centre lines of the tubes. The number of the flanges 18 of the cross piece 12 is equal to the number of the tubes 10 in the said group. Thus, a flange 18 of the cross piece 12 is placed between each pair of adjacent tubes in the group of tubes 10.

The flanges 18 of each cross piece 12 extend between the tubes 10 such that the outside edge of each flange 18 opposite the common edge is parallel to the said edge and is in contact with the outside edge of the flange of the adjacent cross piece 12 placed between the same pair of tubes 10. The cross pieces 12 thus materialize a second approximately continuous wall around each of the compartments 16.

Furthermore, the assembly produced by assembly means 14 is such that each of the flanges 18 of the cross pieces 12 is in contact with each of the tubes 10 placed on each side of this flange, over practically the entire height of the basket. The second wall is materialized by cross pieces 12 around each compartment 16 is therefore at least in partial contact with the first wall materialized by the tubes 10.

Figure 2:
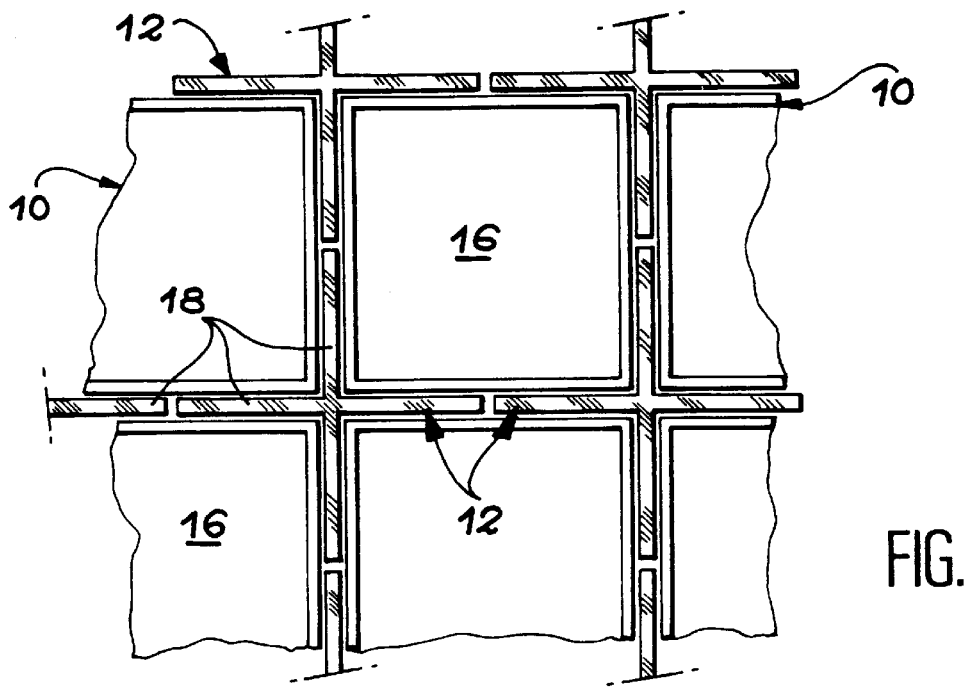
FIG. 2 is a sectional view of the basket in FIG. 1 at a larger scale along a horizontal plane.

In the embodiment illustrated in more detail in FIGS. 1 and 2, each of the tubes has a prismatic square section. The regular network formed by the bundle of tubes 10 is then a network with a square pitch, such that each group of tubes is formed from four adjacent tubes 10. According to the rule mentioned above, each cross piece 12 then comprises four flanges 18, along two directions orthogonal to each other. This layout, as clearly shown in FIGS. 1 and 2, enables a complete surface contact between the flanges 18 of the cross pieces 12 and the adjacent faces of the tubes 10.

As mentioned above, different layouts are possible to enable a reliable contact between the outside edges of the flanges 18 opposite the common edges of the cross pieces 12.

Figure 3A:
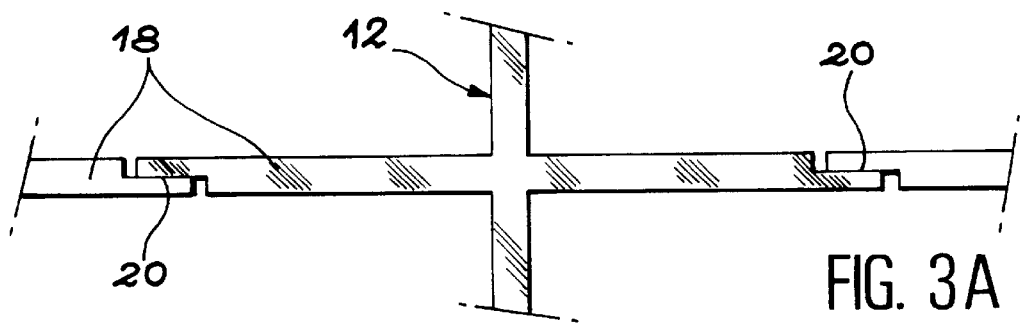
FIGS. 3A and 3B are sectional views comparable with FIG. 2, also illustrating two possible embodiments of the ends of the cross piece flanges at an even larger scale.

According to a first layout illustrated in FIG. 3A, the outside edges of the flanges 18 are provided with flats 20, approximately parallel to the planes of the flanges. More precisely, the flats 20 are located in the median plane of the flanges and oriented to face each other when two adjacent cross pieces 12 are in position. The flats 20 are then in contact with each other over most of the length of their surfaces. This layout is a means of increasing the contact surfaces between the flanges 18 of the cross pieces 12, and consequently facilitating transfer of heat flux from one cross piece to the next.

Figure 3B:
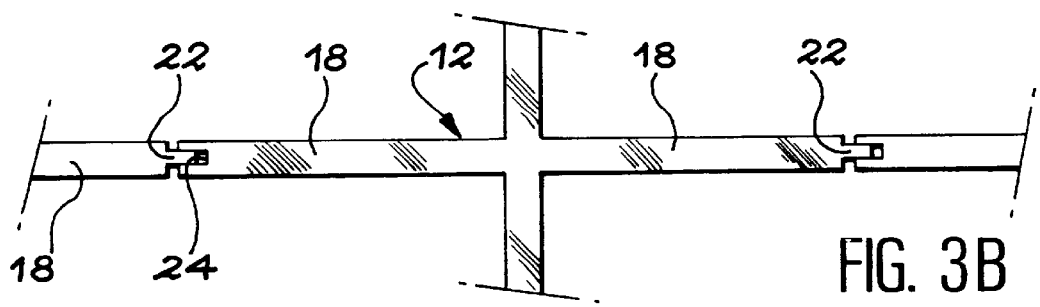

According to a second layout illustrated in FIG. 3B, the outside edges of the flanges of the cross pieces 12 opposite the central edge have complementary shapes on adjacent cross pieces, such that they fit into one another. These complementary shapes may for example be a tenon shape 22 and a mortise shape 24. This layout provides the same advantages as the above, plus a nesting effect that further increases contacts and the propagation of heat flux.

In the basket according to the invention, the main function of the tubes 10 forming the first walls of the compartments is to provide the basket with mechanical strength, both under normal conditions of use and under accidental conditions (for example when the basket is dropped). The geometry of the basket is thus maintained under all circumstances, which helps to maintain control over nuclear criticality.

To enable them to perform this function efficiently, the tubes 10 are advantageously made of a resistant material, preferably chosen among the group comprising stainless steel, carbon steel, aluminium and aluminium alloys with good mechanical properties, and titanium. This list of materials is in no way limitative.

The tubes 10 may be obtained using any manufacturing technique, for example by rolling or folding a plate to the required shape, and then closing it with a longitudinal weld. In the case of aluminium tubes, usual extrusion techniques are advantageously used, such that seamless tubes of any shapes and dimensions can be obtained.

In the basket according to the invention, the function to evacuate heat produced by the radioactive material is achieved mainly by the cross pieces 12. This function is particularly important when the radioactive materials are fuel elements that have been irradiated in nuclear reactors since these elements emit high thermal power.

In the layout according to the invention, the heat flux produced by the radioactive materials is transmitted firstly to the metal in the cross pieces 12 by the metal in the tubes 10 forming the first walls. This transmission is facilitated by the fact that the flanges 18 of the cross pieces 12 forming the second walls of the compartments are held immediately adjacent to the walls of the tubes 10 forming the first walls of the compartments, in order to facilitate heat transfer. The efficiency of this thermal transfer is advantageously increased by choosing the material used for the cross pieces from good heat conducting metals such as copper and its alloys, or aluminium and its alloys.

The heat flux then passes into the material of the cross pieces 12 that are in contact with each other through their outside edges, from the inside towards the outside of the basket. In particular, due to the contact made between the outside edges of the flanges of the cross pieces, the heat flux passes towards the outside of the basket almost without interruption and therefore without encountering any high thermal resistances that could cause an excessive increase in the inside temperature of the basket.

The heat flux is then dissipated into the atmosphere or into the structure of a transport or storage container in which the basket is placed.

When the basket is full of fissile radioactive materials that could cause a chain reaction, its components must also fulfil a third essential function, which is to control nuclear criticality.

This control is achieved firstly by the mechanical strength of the basket, obtained due to the mechanical strength of the tubes 10 forming the first walls of the compartments as described above.

Nuclear criticality is also controlled partly by adding neutron poisons such as boron or cadmium into the structure of the basket. These poisons may be incorporated in dispersed form, either in the metal of the tubes 10 or in the metal of the cross pieces 12 or in both of these components at the same time. Alternately, the poison may also be added in the form of a layer of material, such as a sintered material based on boron carbide, plated on the flanges 18 of the cross pieces 12.

When the neutron poison is boron, it is advantageously enriched in boron 10 which is the isotope of boron that is effective as a neutron absorber. This characteristic is a means of not excessively modifying the mechanical and metallurgical strength of the materials used, while reducing their total boron content.

In one example embodiment, the flanges of the cross pieces 12 are composite partitions comprising bringing a metal that is a very good conductor of heat such as copper or a copper alloy into contact with a material with a high boron content such as sintered material based on carbon boride B4C.

As illustrated in the above example, the same component of the basket may simultaneously fulfil several of the above mentioned functions in order to optimise performances.

In the embodiment of the invention shown in FIG. 1, the assembly means 14 are materialized by encircling structures surrounding the bundle of tubes 10 and cross pieces 12 at different levels. The number of encircling structures 14 is equal to at least two. In FIG. 1, this number is equal to three. Each encircling structure comprises an encircling strip 26 surrounding the tube bundle and a tension system (not shown). Advantageously, the surrounding strips 26 are made of a metal different from the metal used for the tubes 10. This metal is chosen to give a coefficient of expansion less than or possibly equal to that of the coefficient of expansion of the metal in the tubes, such that the cohesion and contact between the tubes and the cross pieces remain unchanged or improve when the temperature increases. The efficiency of heat transfer is preserved. The tightening force of the surrounding structures is initially adjusted to the required value by means of tension systems (not shown).

As shown also in FIG. 1, the basket according to the invention may comprise a rigid bottom plate or lower plate 28, usually metallic, in addition to the components described above. The tubes 10 and the cross pieces 12 connected by assembly means 14 are supported on the lower plate 28. This lower plate is particularly useful to retain radioactive materials, for example when the basket has to be handled separately.

The basket according to the invention may also be fitted with a head plate or a top plate (not shown). This plate may then be fitted with devices for handling the basket.

In one variant embodiment, not shown, the tubes 10 with a prismatic square cross section are replaced by tubes with a rectangular cross section. The cross pieces 12 then comprise two small coplanar flanges with a width equal to half the length of the short side of the rectangle, and two large flanges orthogonal to the first two flanges with a width equal to half the length of the long side of the rectangle.

In another variant embodiment (not shown), the tubes 10 have a prismatic circular section. The flanges of the cross pieces 12 are then tangent to the tubes at their ends. Therefore, this is the location at which heat flux is transmitted from the tubes to the cross pieces.

Figure 4:
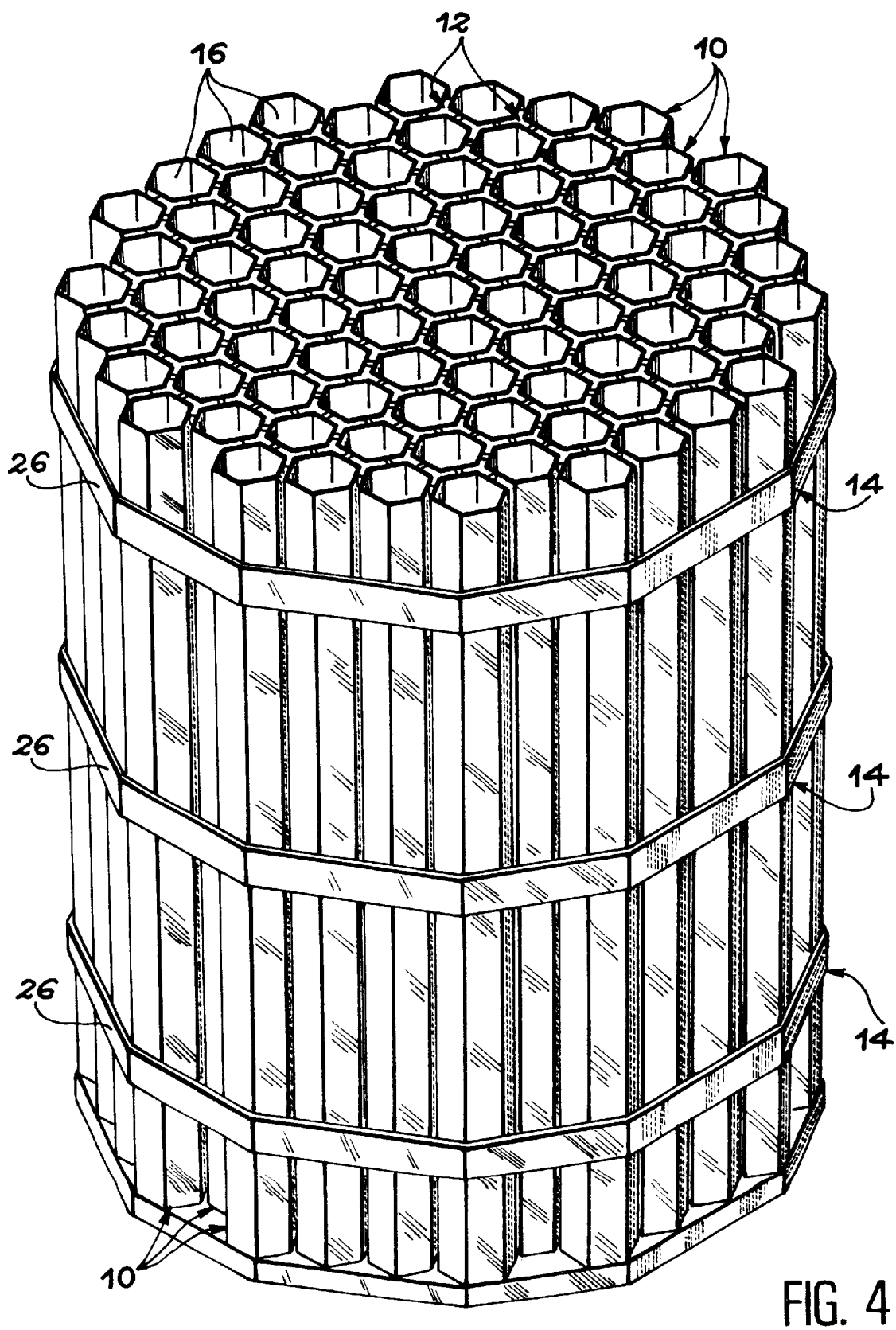
FIG. 4 is a view comparable to FIG. 1, illustrating a second embodiment of the invention.
Figure 5:
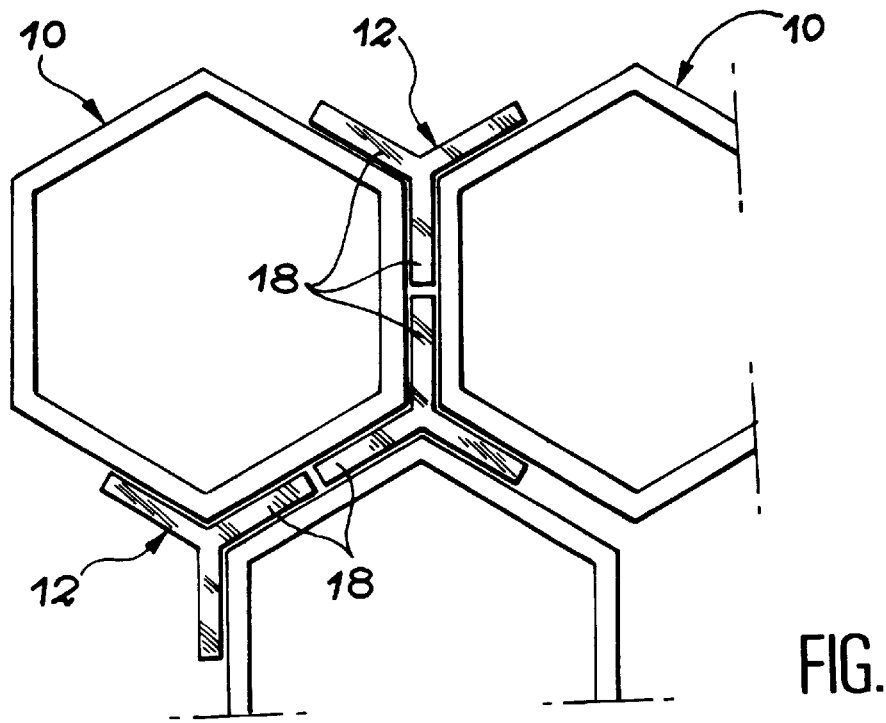
FIG. 5 is a sectional view of the basket in FIG. 4 at a larger scale along a horizontal plane.

The second embodiment of the invention shown in FIGS. 4 and 5 is essentially different from the first embodiment by the shape of the tubes 10.

Thus, instead of having a prismatic square section, in this case the tubes 10 have a prismatic hexagonal section. The bundle of tubes 10 then forms a triangular network. Application of the principles mentioned above means that each cross piece 12 has three flanges 18 laid out at 120° to each other. All other characteristics and properties described for the first embodiment of the invention and its variants are also applicable in this case.

Figure 7:
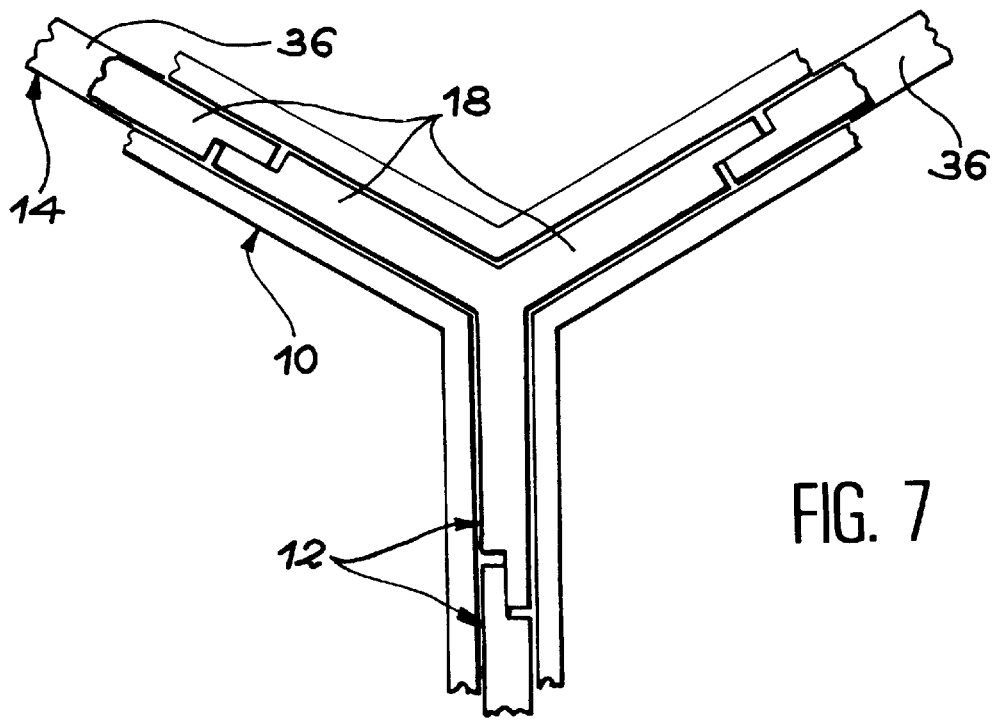
FIG. 7 is a sectional view of the basket in FIG. 6 at a larger scale along a horizontal plane.
Figure 6:
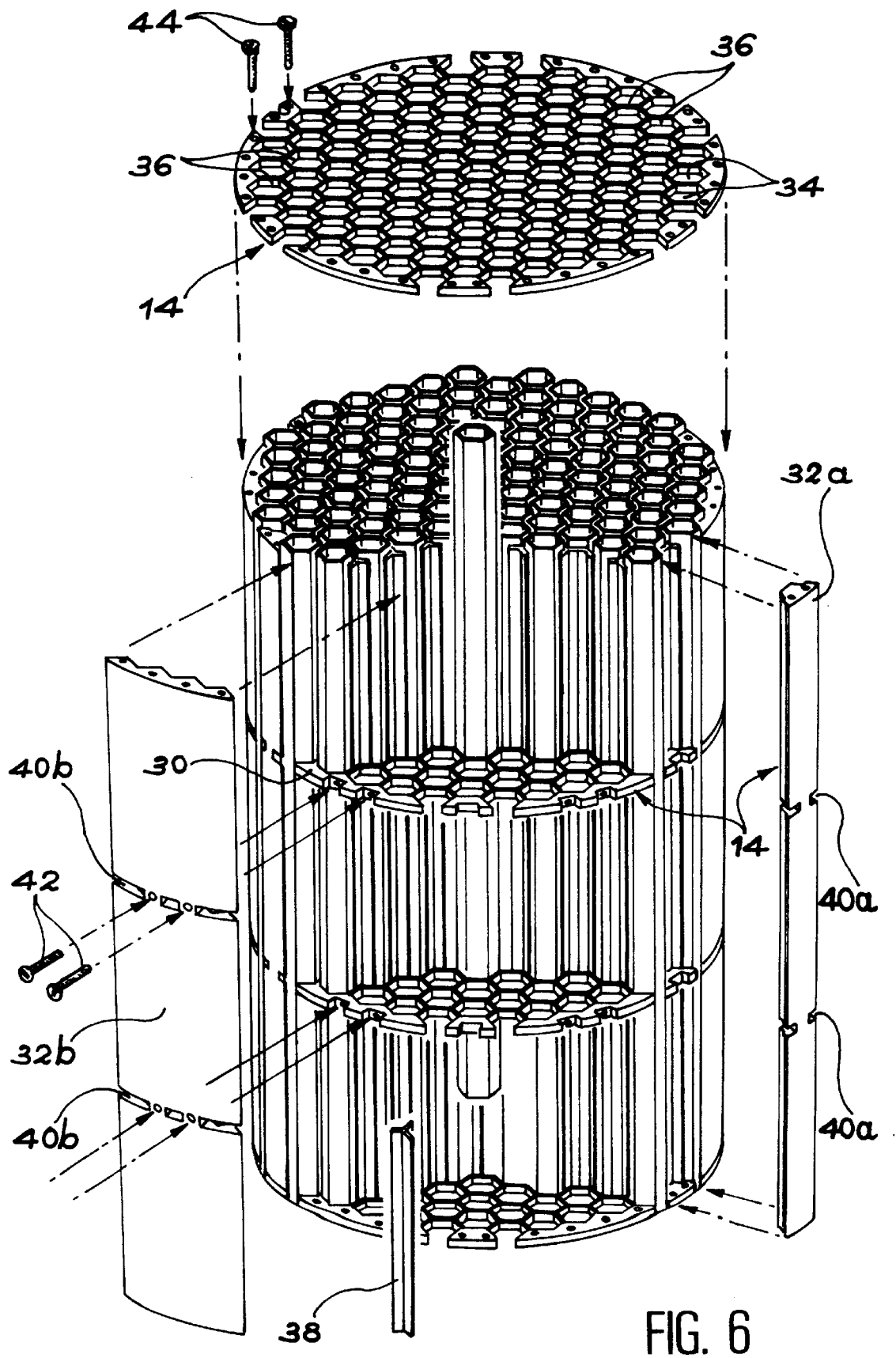
FIG. 6 is an exploded perspective view illustrating a third embodiment of the invention.

FIGS. 6 and 7 show the third embodiment of the invention.

As in the second embodiment in FIGS. 4 and 5, the tubes 10 have a prismatic hexagonal section. However, instead of being composed of surrounding structures, in this case the assembly means 14 comprise perforated metallic plates 30 rigidly fixed to each other by connecting devices 32a, 32b to form a rigid structure to hold the tubes 10 and cross pieces 12 in place.

More precisely, there are at least two plates 30 and they are uniformly distributed over the height of the basket, perpendicular to the centre line of the tubes 10. The plates 30 are thin, (from a few millimeters to a few centimeters) and comprise a network of holes 34, with shapes and dimensions corresponding to the shapes and dimensions of the tubes 10. Thus, in the example shown in which the tubes 10 are hexagonal, the holes 34 are also hexagonal and their dimensions are slightly larger than the dimensions of the tubes. Therefore a tube 10 fits into each of the holes 34 in each of the plates 30 with a small clearance. Since the plates 30 are fixed to each other by connecting devices 32a and 32b, the tubes 10 are then held in place between the supports consisting of the plate walls.

As shown particularly in FIG. 7, the thickness of the walls 36 formed between adjacent holes 34 in the same plate 30 is adjusted to be slightly greater than the thickness of the flanges 18 of the cross pieces 12. This layout leaves sufficient space between the tubes 10 to insert the cross pieces 12, while reducing the assembly clearance to a sufficiently low value to keep the flanges of the cross pieces and the walls of the tubes very close to each other.

Each of the cross pieces 12 is then formed from several segments of cross pieces 38, each segment having a length approximately equal to the distance separating two consecutive plates 30 or the distance separating each end of the basket from the closest plate. This layout means that a second approximately continuous wall can be arranged around each compartment.

As shown diagrammatically in FIG. 6, the plates 30 advantageously include head and bottom plates at the top and bottom ends of the basket respectively. In this case, the head plate is preferably fitted with devices for handling the basket such as eye bolts. The perforated bottom plate may also be replaced or doubled up by a solid plate as described with reference to FIG. 1.

As shown particularly in FIG. 6, the connecting devices 32a and 32b are placed outside the bundle of tubes 10 and they extend parallel to these tubes over the entire height of the basket.

At plates 30 other than the head and bottom plates, the connecting devices 32a and 32b comprise notches 40a and 40b respectively. These notches 40a, 40b fit into a part with a complementary shape and cut out in the peripheral edge of the corresponding plates 30. One or several attachment devices such as screws 42 passing through the connecting devices 32a and 32b fix these devices onto each of the plates 30.

When top and bottom plates are provided, they are fixed to the ends of the connecting devices 32a and 32b by attachment devices such as screws 44.

The layout that has just been described can make the frame formed by plates 30 and connecting devices 32a and 32b into a rigid structure.

In the embodiment illustrated in FIG. 6, the connecting devices 32a and 32b are of two different types depending on the position at which they are located at the periphery of the basket. This is due to the fact that an assembly of tubes 10 with a prismatic hexagonal cross section inside an envelope with a prismatic circular cross section forms firstly recessed parts with a prismatic semi-hexagonal cross section and secondly recessed parts with a prismatic saw tooth cross section, alternately around the periphery of the basket.

The connecting devices 32a have an inner face complementary to the first recessed parts and connecting devices 32b have an inner face complementary to the second recessed parts. The outer faces of the connecting devices 32a and 32b form sectors of a cylinder and they all have the same radius of curvature which is the same as the radius of curvature of the outer cylindrical envelope of the basket. Consequently, when all connecting devices 32a and 32b have been installed around the bundle of tubes 10, their outer faces materialize the outer cylindrical envelope of the basket.

The layout that has just been described is a means of maintaining a uniform clearance between the basket and the container when the basket is placed inside a container. This characteristic improves the transmission of heat flux between the outside of the basket and the container structures.

Obviously, the cylindrical shape of the outer contour of the basket is only given as an example. The prismatic rectangular, square or other section could also be obtained by using appropriate shapes for the connection devices.

The materials used for making the plates 30 and the connection devices 32a and 32b are preferably metals with good mechanical strength such as metals chosen from the group of stainless steels, carbon steels and aluminium alloys with good mechanical properties.

It will be understood that the basket according to the third embodiment that has just been described also has characteristics and properties similar to the characteristics and properties of other embodiments and their variants.

The embodiments and variants described above clearly demonstrate the many advantages of the invention. In particular, it is quite clear that the invention is equally suitable for making baskets with hexagonal compartments and for making baskets with compartments with more standard shapes such as square or rectangular. Furthermore, the compact assembly of the tubes and cross pieces achieved by the different assembly means described facilitates heat transfers. The use of attachment devices such as screws or welds is minimized. Therefore manufacturing costs are optimised.

What is claimed is:

1. Storage basket for radioactive materials comprising a bundle of structurally integral prismatic metallic tubes parallel to each other along a regular network, each tube defining a compartment adapted to receive a radioactive material;

metallic cross pieces, each including at least three flanges connected to each other through a common edge, the cross pieces being located between the said tubes; and in order to define a second approximately continuous wall around the first wall of each compartment and in at least partial contact with it; and with an assembly means grouping the said tubes and the said cross-pieces together, whereby at least one compartment is surrounded by a first approximately continuous wall defined by a said tube, and by a second approximately continuous wall surrounding the first wall and at least in partial contact with the first wall, the second wall formed by the cross pieces.

2. Storage basket according to claim 1, in which the cross pieces are in contact with each other through outside edges of their flanges opposite the said common edge.

3. Storage basket according to claim 2, in which the outside edges of the flanges of the cross pieces are provided with flats approximately parallel to the planes of the said flanges, the cross pieces being in contact with each other through the said flats.

4. Storage basket according to claim 2, in which the outside edges of the flanges of the cross pieces in contact with each other have complementary shapes of the tenon-mortise type such that they nest into each other.

5. Storage basket according to claim 1, in which the said tubes have a prismatic square or rectangular cross section and the cross pieces comprise four flanges along two directions orthogonal to each other.

6. Storage basket according to claim 1, in which the said tubes have a prismatic hexagonal cross section and the cross pieces comprise three flanges along three directions separated by angles of 120°.

7. Storage basket according to claim 1, in which the length of the cross pieces is equal to approximately the length of the said tubes.

8. Storage basket according to claim 1, in which the cross pieces are formed from segments of cross pieces laid out end to end, so that the total length of the said segments is approximately equal to the length of the said tubes.

9. Storage basket according to claim 1, in which the flanges of the cross pieces comprise at least two layers of distinct materials in contact with each other.

10. Storage basket according to claim 1, in which the cross pieces comprise at least one layer of a material chosen from the group comprising aluminium, copper and their alloys.

11. Storage basket according to claim 1, in which at least one of the said tubes and the cross pieces comprises a material including a neutron absorbing element.

12. Storage basket according to claim 11, in which the neutron absorbing element is chosen from the group comprising boron, hafnium and cadmium.

13. Storage basket according to claim 11, in which the neutron absorbing element is boron enriched with boron 10, to at least 80% by weight.

14. Storage basket according to claim 1, in which the said tubes and assembly means are made of materials chosen from the group consisting of different types of stainless steel, carbon steel, aluminium and their alloys, and titanium.

15. Storage basket according to claim 1, in which the assembly means comprise at least two metal encircling structures surrounding the bundle of said tubes, at different levels.

16. Storage basket according to claim 15, in which the encircling structures are made of a material with a thermal coefficient of expansion less than or equal to the thermal coefficient of expansion of the material from which the said tubes are made.

17. Storage basket according to claim 1, in which the assembly means comprise at least two plates at different levels of the basket and connecting devices fixing the plates to each other, each plate being perforated by a network of holes with the same shape as the prismatic cross section of the tubes, and into which the said tubes are fitted.

18. Storage basket according to claim 17, in which at least one of the plates is at one end of the basket.

19. Storage basket according to claim 17, in which the connection devices are fixed to the plates by screws.

20. Storage basket according to claim 17, in which each connecting device comprises an inner surface complementary to the outer envelope of the bundle of said tubes and associated cross pieces, and a regular outer surface forming an outer surface of the basket and providing it with a regular shape.

21. Storage basket according to claim 1, in which the said basket comprises a rigid bottom.

* * * * *